Inventor:
Konrad Müller,
by Carl A. Hellmann,
Attorney.

Patented May 28, 1940

2,202,117

UNITED STATES PATENT OFFICE 2,202,117

MULTIPLE TOOL HOLDER

Konrad Müller, Berlin, Germany

Application March 4, 1939, Serial No. 259,891
In Germany February 28, 1938

4 Claims. (Cl. 29—49)

With the known tool holders, in which the head for holding the turning tools is pivotable about a bolt, the position of the turning tools is usually fixed by means of latches or locking members or by adjusting with a scale.

Apart from the fact that such adjusting means are not very accurate, they wear off very rapidly so that the turning tools are not in the proper position when the head of the tool holder is tightened. Naturally, this fault is noticed in the work.

According to the invention, these disadvantages are obviated by utilizing the mentioned adjusting means, such as latches, locking members, etc., for rough adjustment, whereas the final accurate adjustment is effected by means of two engaging automatically centering sets of teeth such as are used in crown gears of known type. The two sets of centering teeth are either cut into the base plate of the head piece or they are on two rings which are inserted in and fixed to these parts. As the two sets of crown gear teeth bear on one another throughout their entire ring surface, there is practically no wear for many years, but this device would also not alter the accuracy of adjustment, which latter merely depends on the accurate manufacture of the toothed ring itself. In producing a precision toothed ring by means of the rolling process it is, however, possible to obtain values of nearly absolute accuracy. Thus, the continuous adjustment of the position of any turning tool in horizontal, vertical, and peripheral direction is made possible within a few microns (1 micron=0.001 mm.).

An embodiment of the invention is illustrated, by way of example, in the accompanying drawing in which—

Figure 1:
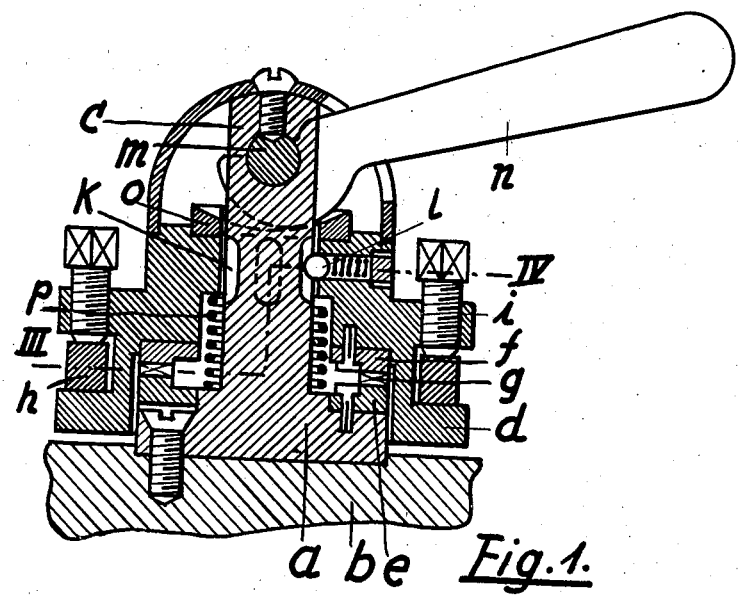
Fig. 1 is a cross section taken on the line I—II of Fig. 2.
Figures 2, 3:
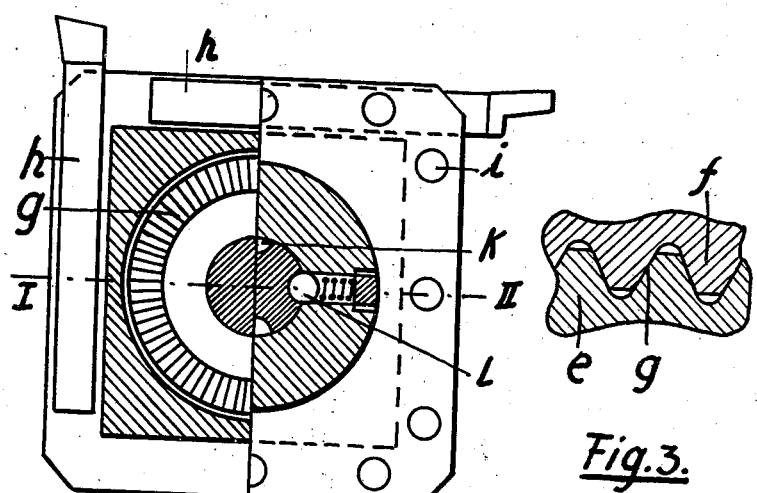
Fig. 2 is a horizontal section taken on the line III—IV of Fig. 1.
Fig. 3 is a cross section of the crown gear teeth.

The multiple tool holder (Fig. 1) consists of a fixed base plate $a$, preferably forming one piece with the bolt $c$ and screwed on to the slide rest of the lathe. The head $d$ having a bore is pushed over the bolt $c$ so as to turn about the latter. The bore is considerably wider than the diameter of the bolt, in order to ensure a perfectly free adjustment. The two parts are coupled by two automatically centering rings $e$ and $f$ with crown teeth $g$. The ring $e$ is rigidly connected to the base plate $a$ and the ring $f$ is connected to the head $d$. The crown teeth $g$ are shown in cross section in Fig. 3. The turning tools $h$ are arranged in grooves and fixed by means of screws $i$.

The rough adjustment is formed by the grooves $k$ in the bolt $c$ and by the spring-actuated ball $l$ arranged in a bore in the head $d$ by which it is carried round. The grooves $k$ are long enough to retain the ball $l$ in the grooves when the head $d$ is moved in the vertical direction. The grooves $k$ are well rounded so as to let the ball easily engage and disengage the walls of the grooves when the head $d$ is turned. Instead of a ball, which is merely provided by way of example, any other known kind of locking device may be used.

The head $d$ of the tool holder is pressed onto the base plate $a$ by means of a one-hand lever $n$ turning about a pivot $m$, the spherical pressure surface of the lever being eccentric and moving on a spherically curved support $o$. The pivot $m$ lies transversely in the bolt $c$. The helical spring $p$ serves to lift the head $d$ and to disengage the crown teeth $g$ when the lever $n$ is released. In addition, a locking device of known type may be provided in order to prevent the head $d$ from being pressed down when the ball does not engage in one of the grooves $k$.

Operation.—When the lever $n$ is raised, the head $d$ is automatically lifted by the spring $p$, disengaging the crown teeth $g$. The head $d$ is then turned until it occupies another desired position, the ball $l$ engaging in another desired groove $k$. The head $d$ is now in the position for rough adjusting, the interchangeable teeth at $g$ being correctly opposed to each other. Then the lever $n$ is pressed down, causing the teeth to engage and the respective turning tool, for example $h$, to occupy the correct position which it had before. Therefore, the adjustment is effected without an axis or an index.

Modifications and changes may be made in the construction described, without departing from the spirit or scope of the invention. It is merely important that the position of the head is predetermined by a rough adjustment and that the accurate fixing in the correct position of any turning tool in horizontal, vertical, and peripheral direction is effected by another device consisting of two rings with crown teeth. In addition, a locking device may be provided to prevent downward movement, when the rough adjustment is not in the correct position.

The application of the new multiple head for holding tools is not limited to lathes. It can also be attached to machine tools of other kinds, for example planing machines, etc. If, instead of the turning tool, a spindle is inserted, it may also be attached to grinding and milling machines.

The construction illustrated by way of example shows a four-part head for holding tools, but the head may be constructed for any other number of tools that may be accommodated without changing the fundamental elements of the head. In particular, the ring e with crown teeth may be fixed directly to the slide rest without an intermediate base plate. It is not absolutely necessary to use a rough adjustment for facilitating and securing the adjustment. It is also possible to use two discs with crown teeth for connecting and fixing the parts of the tool holder without the facility and the securing of the adjustment by the rough adjuster, in which case the minimum number of teeth in the set of crown teeth should be equal to the number of tools.

What I claim is:

1. A multiple tool-holder consisting of a support, a base portion secured to said support, a cutter-holding head, freely pivotable about an axis with respect to the base portion, and two self-centering substantially plane crown-toothed rings, one of which is rigidly connected with the base and the other with the pivotable tool-holding head, and which, without any additional means, provides the connection and the precise positioning of the active cutting edges of the tools in the horizontal, vertical, and peripheral directions.

2. A multiple tool-holder consisting of a support, a base portion secured to said support, a cutter-holding head, freely pivotable about an axis with respect to the base portion, two self-centering substantially plane crown-toothed rings, one of which is rigidly connected with the base and the other with the pivotable tool-holding head, and additional means cooperating with said base portion and said head constituting a preselector of the desired setting of the tools, said rings alone providing the connection and the precise positioning of the active cutting edges of the tools in the horizontal, vertical, and peripheral directions.

3. A multiple tool-holder as defined in claim 2, wherein the number of possible settings of the pre-selector is the same as the maximum possible number of cutting tools that may be held by the tool-holder.

4. A multiple tool-holder as defined in claim 2, having also a locking device which prevents inadvertently connecting the toothed members in any positions between the individual pre-selector positions.

KONRAD MÜLLER.